US011725769B2

(12) United States Patent
Huang et al.

(10) Patent No.: US 11,725,769 B2
(45) Date of Patent: Aug. 15, 2023

(54) SUPPORTING DEVICE

(71) Applicant: SYNCMOLD ENTERPRISE CORP., New Taipei (TW)

(72) Inventors: Chun-Hao Huang, New Taipei (TW); Chien-Wei Cheng, New Taipei (TW); Chien-Cheng Yeh, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 14 days.

(21) Appl. No.: 17/644,804

(22) Filed: Dec. 17, 2021

(65) Prior Publication Data

US 2022/0228699 A1 Jul. 21, 2022

Related U.S. Application Data

(60) Provisional application No. 63/138,981, filed on Jan. 19, 2021.

(30) Foreign Application Priority Data

Oct. 26, 2021 (TW) ................................ 110212592

(51) Int. Cl.
*F16M 11/12* (2006.01)
*F16M 11/04* (2006.01)
(Continued)

(52) U.S. Cl.
CPC .......... *F16M 11/041* (2013.01); *F16M 11/06* (2013.01); *F16M 11/10* (2013.01);
(Continued)

(58) Field of Classification Search
CPC ...... F16M 11/041; F16M 11/06; F16M 11/10; F16M 11/125; F16M 11/24;
(Continued)

(56) References Cited

U.S. PATENT DOCUMENTS

| 2010/0001147 A1* | 1/2010 | Wang ................. F16M 11/2021 345/87 |
| 2010/0065694 A1* | 3/2010 | Duan ..................... F16M 11/10 16/386 |

(Continued)

FOREIGN PATENT DOCUMENTS

| CN | 104882129 A | * | 9/2015 | ........... F16M 11/046 |
| CN | 107466349 A | * | 12/2017 | ............ F16C 11/103 |

(Continued)

*Primary Examiner* — Tan Le
(74) *Attorney, Agent, or Firm* — Osha Bergman Watanabe & Burton LLP (57) ABSTRACT

A supporting device is provided and includes: an upright column; a protruding neck arranged on the upright column; a spindle rod unit with a main spindle rod fixed on the protruding neck along a second axis; a first rotating rod; a carrying board unit having a first frame pivoted on the main spindle rod, the first frame having a first upper half part and a first lower half part, the first rotating rod passing through one of the first upper half part and the first lower half part and being able to rotate relative to the main spindle rod with the second axis as an axis; a first fin set being sleeved on the main spindle rod and the first rotating rod; a first friction set stacked alternately with the first fin set; and an elastic element set connected to the protruding neck and the carrying board unit.

20 Claims, 7 Drawing Sheets

(51) Int. Cl.
*F16M 11/10* (2006.01)
*F16M 11/24* (2006.01)
*F16M 11/06* (2006.01)
*F16M 11/22* (2006.01)

(52) U.S. Cl.
CPC .......... *F16M 11/125* (2013.01); *F16M 11/24* (2013.01); *F16M 11/22* (2013.01); *F16M 2200/022* (2013.01); *F16M 2200/024* (2013.01); *F16M 2200/027* (2013.01); *F16M 2200/041* (2013.01)

(58) Field of Classification Search
CPC ....... F16M 2200/022; F16M 2200/024; F16M 2200/027; F16M 2200/041
See application file for complete search history.

(56) References Cited

U.S. PATENT DOCUMENTS

2017/0152986 A1* 6/2017 Ho ................... F16M 11/2014
2022/0049813 A1* 2/2022 Lee ................... F16M 11/125

FOREIGN PATENT DOCUMENTS

| CN | 106499933 B | * | 5/2018 |
| CN | 216079023 U | * | 3/2022 |
| TW | I513312 B | | 12/2015 |
| TW | M597840 U | | 7/2020 |

* cited by examiner

SUPPORTING DEVICE

CROSS-REFERENCE TO RELATED APPLICATION

This application claims the benefit of U.S. Provisional Application Ser. No. 63/138,981 filed on Jan. 19, 2021, and the benefit of Taiwan Patent Application Serial No. 110212592 filed on Oct. 26, 2021. The entirety of each Application is incorporated herein by reference.

BACKGROUND

1. Technical Field

The present disclosure relates to a supporting device, and more particularly, to a supporting device that can meet the torque requirements of large-size displays and has a good operating feel while maintaining a light and thin overall thickness.

2. Description of Related Art

The Taiwan Patent No. M597840 discloses an adjustable supporting stand for carrying a display, which mainly includes a main column, an extension piece, a tilt unit, a rotation unit and a limit plate. The extension piece extends from the main column, the tilt unit pivots about an axis, and the rotation unit rotates about a virtual axis, wherein the axis intersects the virtual axis at a point. The tilt unit includes a connecting rod, two pivoting pieces, a fixed plate, two torsion springs, two nuts, and two gasket sets. The connecting rod extends along the axis and is connected to the extension piece, and the pivoting piece is pivotally connected to the connecting rod, and the fixed plate is connected to the pivoting piece. The pivoting piece and the fixed plate pivot about the axis, and each of the torsion springs is respectively sleeved on the connecting rod and respectively fixed on the extension piece and the pivoting piece. The nuts are respectively arranged at both ends of the connecting rod, and the gasket sets are respectively arranged between the torsion springs and the pivoting piece, and between the pivoting piece and the nuts. The rotation unit is rotatably disposed on the fixed plate and includes a rotating plate and an engaging hole. The engaging hole is formed on the rotating plate and can be rotatably engaged with the fixed plate. The display is arranged on the rotating plate and can rotate with the rotating plate about the virtual axis. The limit plate is locked to the fixed plate, and the rotating plate is clamped between the fixed plate and the limit plate.

In addition, the Taiwan Patent No. I513312 describes a screen supporting device, which includes a bracket module, two hinge structures, a carrying member, and a torque adjustment structure. The hinge structures are respectively pivoted on a top end of the bracket module, and includes a spindle rod, a washer set and a nut. The cross section of each of the spindle rods is non-circular, and each of the washer sets is respectively sleeved on the spindle rod and has a stop washer and three raised washers. Each of the stop washers is sleeved on the spindle rods respectively and has a positioning hole corresponding to the cross section of each spindle rod, and each of the nuts is screw-locked to the ends of the spindle rods. The carrying member is sleeved on two spindle rods and abuts against the stop washers, and can pivot relative to the bracket module with the spindle rods as an axis. The torque adjustment structure includes two limit spacers and two torsion springs. Each limit spacer has a non-circular positioning hole. The torsion springs are respectively sleeved on the spindle rods and connect the carrying member and the limit spacers. The opposite sides of each of the raised washers abut against the limit washers and the nuts, respectively. Therefore, when the carrying member is pivoted by an external force, the spindle rods and the limit washers sleeved on it remain stationary, and the raised washers pivot together with the carrying member and provides a frictional force. Meanwhile, the torsion springs are twisted to provide an additional torsion force, so that when the external force is removed, the carrying member can stop at any position relative to the bracket module.

In the supporting stand mentioned in the aforementioned M597840, the tilt unit is arranged in the rotation unit, which is a hidden design, so the torsion spring cannot protrude outside the rotation unit. In other words, the diameter of the torsion spring sleeved on the connecting rod is smaller than the thickness of the rotation unit, so a torsion spring with a large diameter (large torque) cannot be used, and the torque provided will be limited, and may not meet the torque requirements for mounting large-size (heavier) displays.

In addition, if the screen supporting device mentioned in I513312 needs to increase the friction, it can be achieved by increasing the number of the raised washers and the limit washers. However, if a plurality of raised washers and limit washers are stacked on top of each other, there is no guarantee that each raised washer and each limit washer can effectively rub against each other.

SUMMARY

In view of the aforementioned problems of the prior art, the present disclosure provides a supporting device for carrying a display, comprising: an upright column substantially extending along a gravity direction and including an opening; a protruding neck arranged on the upright column and partially extending outward from the opening along a first axis that is not parallel to the gravity direction; a spindle rod unit having a main spindle rod fixed on the protruding neck along a second axis that is substantially perpendicular to the gravity direction; a carrying board unit being pivoted on the main spindle rod, being used for carrying the display and having an upper half area and a lower half area relative to the gravity direction and the second axis; and an elastic element set, including: a first elastic element with one end arranged on the protruding neck and the other end arranged on one of the upper half area and the lower half area, and constantly providing a first elastic force, wherein the first elastic force tends to make the carrying board unit pivot in a direction of rotation with the second axis as an axis, wherein the upper half area is located above the main spindle rod, and the lower half area is located below the main spindle rod, wherein when an external force is applied, the carrying board unit is able to rotate between a first position and a second position relative to the protruding neck with the second axis as the axis to adjust an inclination angle of the display, and wherein when the external force is removed, the carrying board unit stops at an arbitrary position between the first position and the second position.

In the aforementioned supporting device, when the first elastic element abuts against the upper half area, the first elastic force is a pulling force toward the upright column, and when the first elastic element abuts against the lower half area, the first elastic force is a thrust away from the upright column.

In the aforementioned supporting device, when the carrying board unit is transferred from the first position to the second position, the first elastic force gradually increases.

In the aforementioned supporting device, the elastic element set further includes a second elastic element. One end of the second elastic element is arranged on the protruding neck, and the other end of the second elastic element is arranged on the other one of the upper half area and the lower half area.

In the aforementioned supporting device, the protruding neck has a first blind groove and a second blind groove. The first elastic element is accommodated in the first blind groove, and the second elastic element is accommodated in the second blind groove.

In the aforementioned supporting device, the first elastic element abuts against the lower half area, and the second elastic element abuts against the upper half area. The first elastic element has a compression spring, and the second elastic element has an extension spring. When the carrying board unit is transferred from the first position to the second position, a compression amount of the compression spring gradually increases, and an extension amount of the extension spring gradually increases.

In the aforementioned supporting device, the protruding neck further has a first inner surface surrounding and defining the first blind groove and a second inner surface surrounding and defining the second blind groove. The first elastic element abuts against the first inner surface, and the second elastic element is fixed to the second inner surface.

In the aforementioned supporting device, the first blind groove and the second blind groove extend substantially parallel to the first axis.

In the aforementioned supporting device, the first elastic element further has a cone column. The cone column has a tip and a flat end opposite to the tip, wherein the tip abuts the lower half area, and the flat end is for the compression spring to abut.

In the aforementioned supporting device, the first elastic element further has a sleeve being sleeved on the cone column.

In the aforementioned supporting device, the present disclosure further comprises a friction unit having a first fin set, a first friction set, a second fin set and a second friction set. The carrying board unit further includes a first frame and a second frame, wherein the first frame, the first fin set and the first friction set are arranged on one side of the protruding neck, and the second frame, the second fin set and the second friction set are arranged on the other side of the protruding neck.

In the aforementioned supporting device, the carrying board unit further includes a front plate, a main plate, a rear plate and an accommodating space. The front plate, the main plate and the rear plate together surround and define the accommodating space. The first frame, the second frame, the friction unit and the spindle rod unit are accommodated in the accommodating space, and the first frame, the second frame and the friction unit are able to be limited in the accommodating space by the front plate and the rear plate.

In the aforementioned supporting device, the rear plate has a first locking hole and a second locking hole, the first frame has a first screw hole, and the second frame has a second screw hole. The first locking hole and the first screw hole are correspondingly intercommunicated, and the second locking hole and the second screw hole are correspondingly intercommunicated.

In the aforementioned supporting device, the upper half area further has a hook hole, and the second inner surface has a hook portion, and the extension spring is respectively disposed on the hook hole and the hook portion.

In the aforementioned supporting device, the carrying board unit further includes two friction rings. One of the friction rings is sandwiched between the main plate and the front plate, and the other one of the friction rings is sandwiched between the main plate and the rear plate.

In the aforementioned supporting device, the main plate is connected to the display and has a blocking hook, and the rear plate further has two stoppers. The main plate is able to rotate about a third axis relative to the protruding neck. When the blocking hook stops by one of the stoppers, the display is in a vertical state relative to the upright column.

In the aforementioned supporting device, the first fin set has a plurality of first fins, and the second fin set has a plurality of second fins. Each of the first fins and each of the second fins are respectively sleeved on the main spindle rod. The first friction set has a plurality of first friction pieces, and the second friction set has a plurality of second friction pieces. Each of the first fins and each of the first friction pieces are stacked in an alternate manner, and each of the second fins and each of the second friction pieces are stacked in an alternate manner.

In the aforementioned supporting device, when the carrying board unit rotates relative to the protruding neck between the first position and the second position with the second axis as the axis, the first fin set and the second fin set are driven to rotate with the second axis as the axis. The first friction pieces and the second friction pieces are free from rotating relative to the main spindle rod, such that each of the first fins generates relative rotation and friction with the adjacent first friction piece, and each of the second fins generates relative rotation and friction with the adjacent second friction piece.

The present disclosure further provides a supporting device for carrying a display, comprising: an upright column substantially extending along a gravity direction and including an opening; a protruding neck arranged on the upright column and partly extending outward from the opening along a first axis being not parallel to the gravity direction; a spindle rod unit having: a main spindle rod fixed to the protruding neck along a second axis; and a first rotating rod; a carrying board unit for carrying the display and having a first frame, the first frame being pivoted on the main spindle rod and having a first upper half part and a first lower half part relative to the gravity direction and the second axis, the first rotating rod passing through one of the first upper half part and the first lower half part in parallel to the second axis and being able to rotate relative to the main spindle rod with the second axis as an axis; a friction unit having: a first fin set having a plurality of first fins, each of the first fins being sleeved on the main spindle rod and the first rotating rod, respectively; and a first friction set having a plurality of first friction pieces, each of the first fins and each of the first friction pieces are stacked alternately; and an elastic element set connecting the protruding neck and the carrying board unit and constantly providing an elastic force, wherein the first upper half part is located above the main spindle rod, and the first lower half part is located below the main spindle rod, wherein when an external force is applied, the carrying board unit is able to rotate between a first position and a second position relative to the protruding neck with the second axis as the axis, and the first rotating rod rotates relative to the main spindle rod to drive the first fin set to rotate with the second axis as the axis, thereby making each of the first fins generates relative rotation and friction with the adjacent first friction piece, and wherein when the external force is removed, the carrying board unit stops at an arbitrary position between the first position and the second position.

In the aforementioned supporting device, each of the first fins has a first circular hole and a first through hole. The main spindle rod passes through the first circular holes, and the first rotating rod passes through the first through holes. A cross section of each of the first circular holes and a cross section of each of the first through holes are circular, a cross section of the main spindle rod is non-circular, and a cross section of the first rotating rod is circular.

In the aforementioned supporting device, each of the first fins has a first length and a first width, and each of the first lengths is greater than each of the first widths.

In the aforementioned supporting device, the spindle rod unit further has a first pivot rod, the first pivot rod passes through the other one of the first upper half part and the first lower half part in parallel to the second axis, passes through the first fin set, is able to rotate relative to the main spindle rod with the second axis as the axis, and drives the first fin set to rotate together with the first rotating rod.

In the aforementioned supporting device, the protruding neck includes an assembly hole. Each of the first friction pieces has a first fixing hole, and the main spindle rod passes through the assembly hole and the first fixing holes. A cross section of each of the first fixing holes matches the cross section of the main spindle rod. When the carrying board unit pivots relative to the protruding neck, the first friction pieces are free from rotating relative to the main spindle rod.

In the aforementioned supporting device, the first rotating rod, the main spindle rod and the first pivot rod are arranged up and down along the gravity direction.

In the aforementioned supporting device, the friction unit further has a first upper gasket set and a first lower gasket set. The first upper gasket set is sleeved on the first rotating rod and moves simultaneously with the first rotating rod. The first lower gasket set is sleeved on the first pivot rod and moves simultaneously with the first pivot rod. The first upper gasket set and the first lower gasket set are spaced apart along the gravity direction.

In the aforementioned supporting device, each of the first fins further has a first penetrating hole. The first pivot rod passes through the first penetrating holes. The first upper gasket set has a plurality of first upper gaskets, and the first lower gasket set has a plurality of first lower gaskets. One of the first upper gaskets is sandwiched between two adjacent ones of the first fins, and one of the first lower gaskets is sandwiched between two adjacent ones of the first fins.

In the aforementioned supporting device, the friction unit further has a first reinforcing piece. The first reinforcing piece is arranged between the first fin set and the protruding neck and has a first hole, a first rotating screw hole and a first pivot screw hole. The first hole is provided for the main spindle rod to pass through, the first rotating screw hole is provided for the first rotating rod to screw, the first pivot screw hole is provided for the first pivot rod to screw to rotate relative to the main spindle rod.

In the aforementioned supporting device, a thickness of the first reinforcing piece is greater than a thickness of any of the first fins.

In the aforementioned supporting device, the carrying board unit further has a second frame pivoted on the main spindle rod, and has a second upper half part and a second lower half part relative to the gravity direction, wherein the second upper half part is located above the main spindle rod, and the second lower half part is located below the main spindle rod; the spindle rod unit further has: a second rotating rod passing through one of the second upper half part and the second lower half part parallel to the second axis, and being able to rotate relative to the main spindle rod with the second axis as the axis; the friction unit further has: a second fin set having a plurality of second fins, and each of the second fins being respectively sleeved on the main spindle rod and the second rotating rod; and a second friction set having a plurality of second friction pieces, and each of the second fins and each of the second friction pieces being stacked alternately, wherein when the carrying board unit rotates relative to the protruding neck between the first position and the second position with the second axis as the axis, and the second rotating rod rotates relative to the main spindle rod, the second fin is driven to rotate with the second axis as the axis, such that each of the second fins generates relative rotation and friction with the adjacent second friction piece.

In the aforementioned supporting device, the carrying board unit further includes a front plate, a main plate, a rear plate and an accommodating space. The main plate is located between the front plate and the rear plate. The front plate, the main plate and the rear plate together surround and define the accommodating space. The first frame, the first rotating rod, the first fin set and the first friction set are arranged on one side of the protruding neck and accommodated in the accommodating space, and the second frame, the second rotating rod, the second fin set and the second friction set are arranged on the other side of the protruding neck and accommodated in the accommodating space.

In the aforementioned supporting device, the rear plate has a first locking hole and a second locking hole. The first frame has a first screw hole, and the second frame has a second screw hole. The first locking hole and the first screw hole are correspondingly intercommunicated, and the second locking hole and the second screw hole are correspondingly intercommunicated. The accommodating space is provided for the protruding neck to pass through, and the first frame and the second frame are able to be limited in the accommodating space by the front plate and the rear plate.

In the aforementioned supporting device, the carrying board unit further has two friction rings. One of the friction rings is sandwiched between the main plate and the front plate, and the other one of the friction rings is sandwiched between the main plate and the rear plate.

In the aforementioned supporting device, each of the second fins has a second circular hole and a second through hole. The main spindle rod passes through the second circular holes, and the second rotating rod passes through the second through holes. A cross section of each of the second circular holes and a cross section of each of the second through holes are both circular, and a cross section of the second rotating rod is circular.

In the aforementioned supporting device, each of the second fins has a second length and a second width, and each of the second lengths is greater than each of the second widths.

In the aforementioned supporting device, the elastic element set includes a first elastic element and a second elastic element. The protruding neck has a first blind groove and a second blind groove. The first elastic element is accommodated in the first blind groove, and the second elastic element is accommodated in the second blind groove.

In the aforementioned supporting device, the first elastic element has a compression spring, and the second elastic element has an extension spring. When the carrying board unit is transferred from the first position to the second position, a compression amount of the compression spring gradually increases, and an extension amount of the extension spring gradually increases.

In the aforementioned supporting device, the front plate has a hook hole, the protruding neck includes a hook portion, and the extension spring is respectively disposed on the hook hole and the hook portion.

In the aforementioned supporting device, the main plate is connected to the display and has a blocking hook, and the rear plate further has two stoppers. The main plate is able to rotate relative to the protruding neck about a third axis. When the blocking hook is stopped by one of the stoppers, the display is in a vertical state relative to the upright column.

DETAILED DESCRIPTIONS

Figure 1:
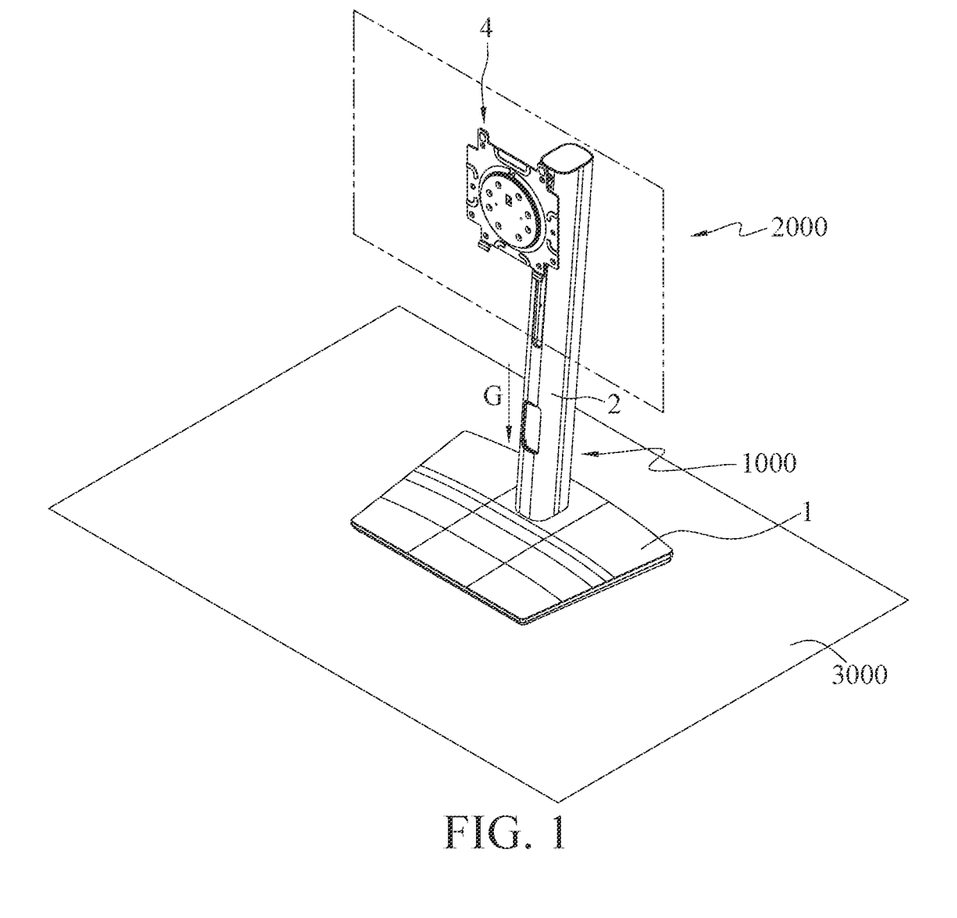
FIG. 1 is an overall schematic diagram of a supporting device according to the present disclosure.
Figure 2:
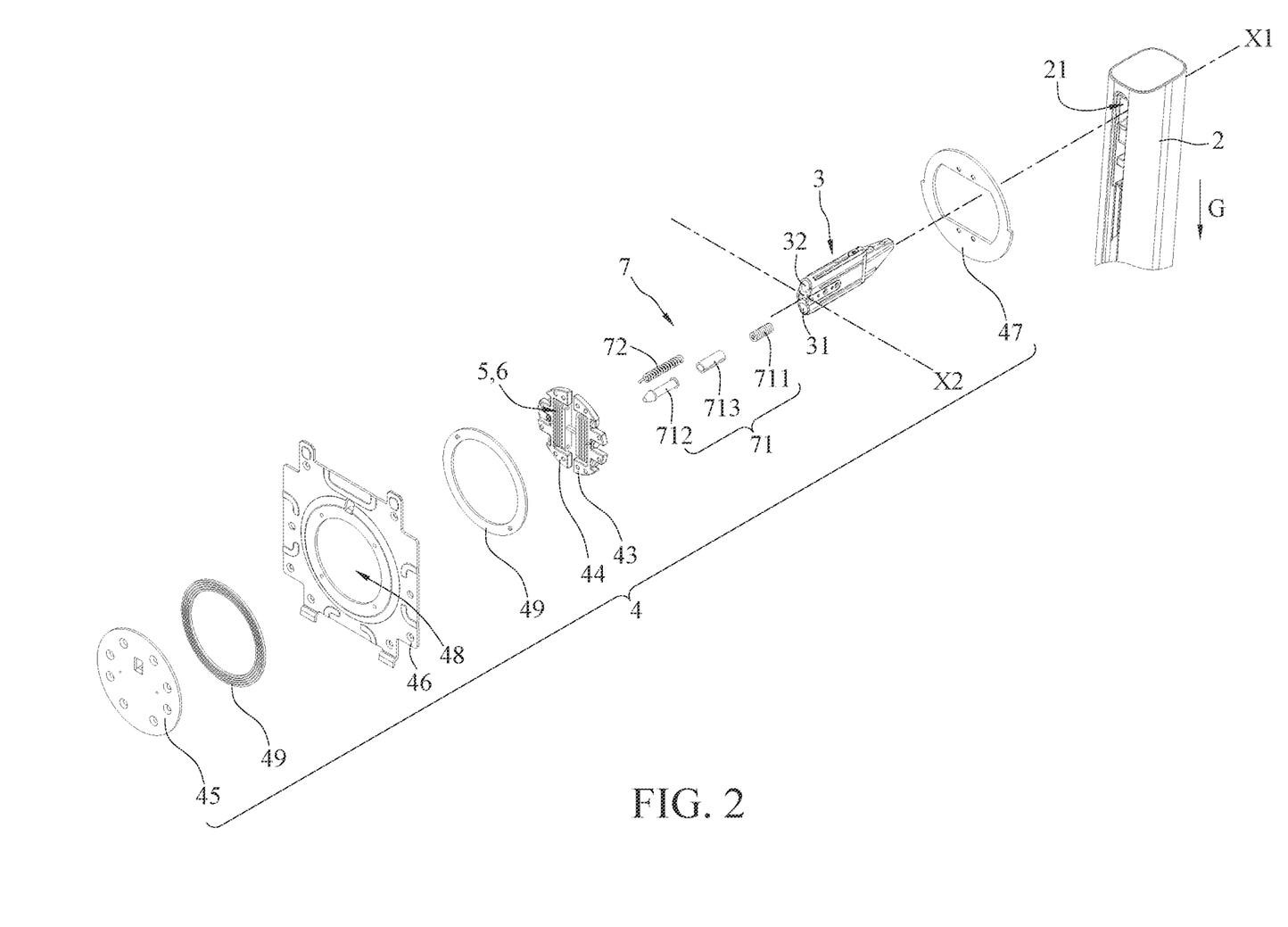
FIGS. 2 and 3 are exploded schematic diagrams of different perspectives of some elements in the supporting device according to the present disclosure.
Figure 3:
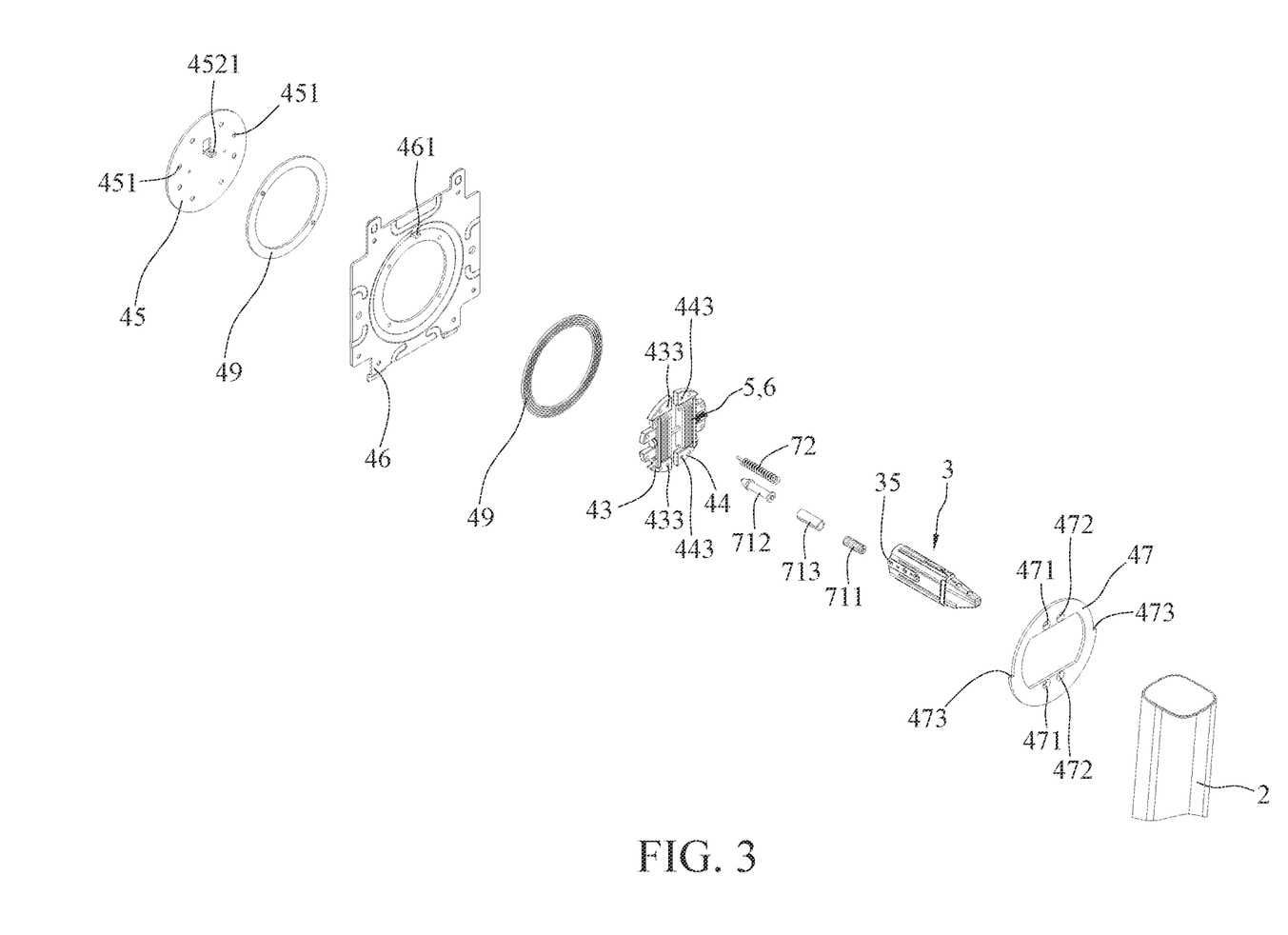
Figure 4A:
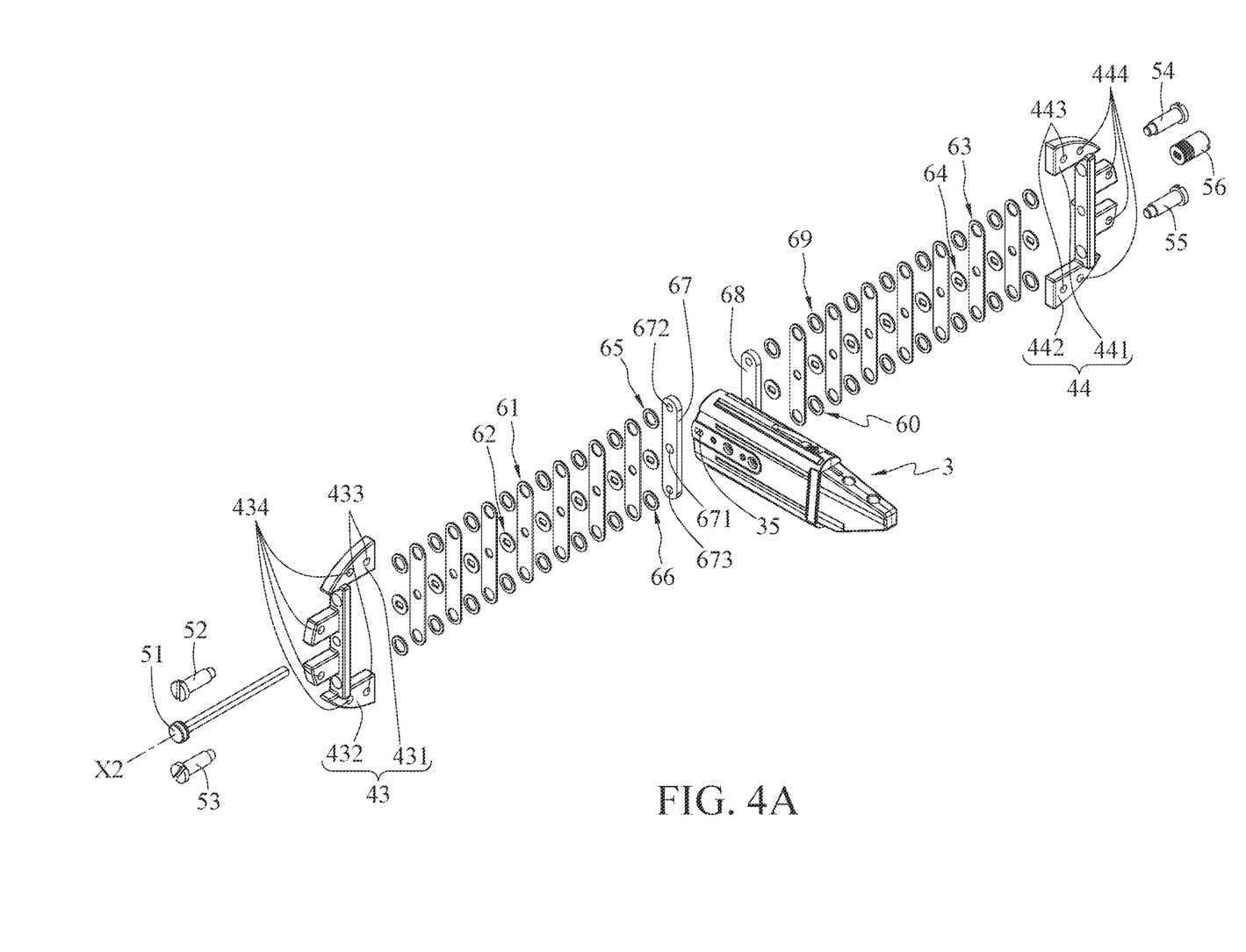
FIG. 4A is an exploded schematic diagram of a protruding neck, a carrying board unit, a spindle rod unit and a friction unit of the supporting device according to the present disclosure.
Figure 4B:
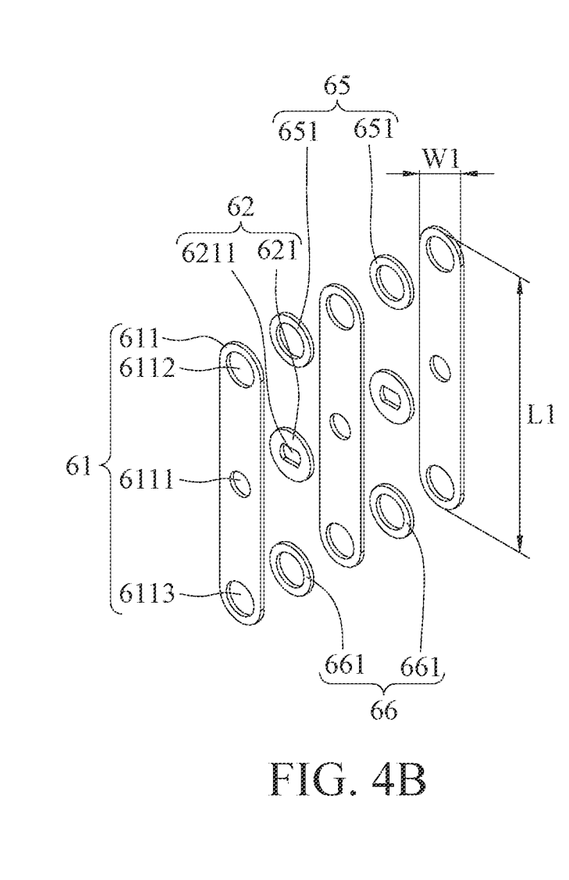
FIGS. 4B and 4C are enlarged and exploded schematic diagrams of some elements of the friction unit in FIG. 4A.
Figure 4C:
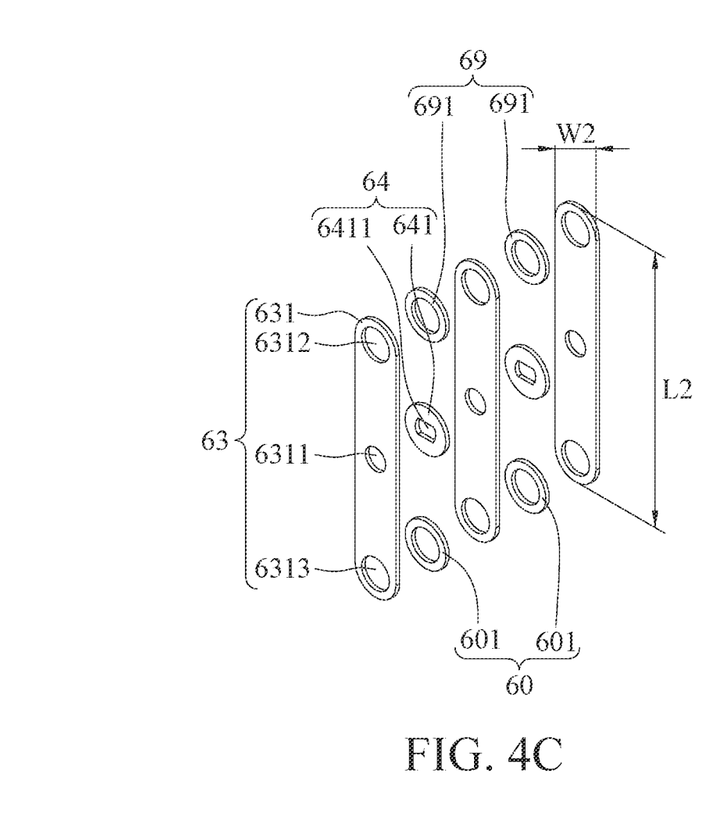

Please refer to FIGS. 1 to 3, a supporting device 1000 according to the present disclosure is used to carry a display 2000 on a work surface 3000 (such as a desktop), with reference to FIGS. 4A to 4C, the supporting device 1000 includes a base 1, an upright column 2, a protruding neck 3, a carrying board unit 4, a spindle rod unit 5, a friction unit 6 and an elastic element set 7. The base 1 is arranged on the work surface 3000. The upright column 2 is arranged on the base 1 and extends substantially along a gravity direction G. The protruding neck 3 is arranged on the upright column 2. The carrying board unit 4 is connected to the protruding neck 3 and used to carry the display 2000. The spindle rod unit 5 is connected to the protruding neck 3 and is provided for the carrying board unit 4 to be pivotally disposed. The friction unit 6 is sleeved on the spindle rod unit 5. The elastic element set 7 is arranged on the protruding neck 3 and the carrying board unit 4, and constantly provides an elastic force.

The base 1 is roughly a rectangular plate, so that it can be firmly placed directly on the work surface 3000, but it is not limited to this. For example, the base 1 can also be screwed (on a wall) or clamped (on a desktop).

The upright column 2 is roughly a rectangular column, which is arranged on the base 1 and includes an opening 21 that extends substantially along the gravity direction G.

Figure 5:
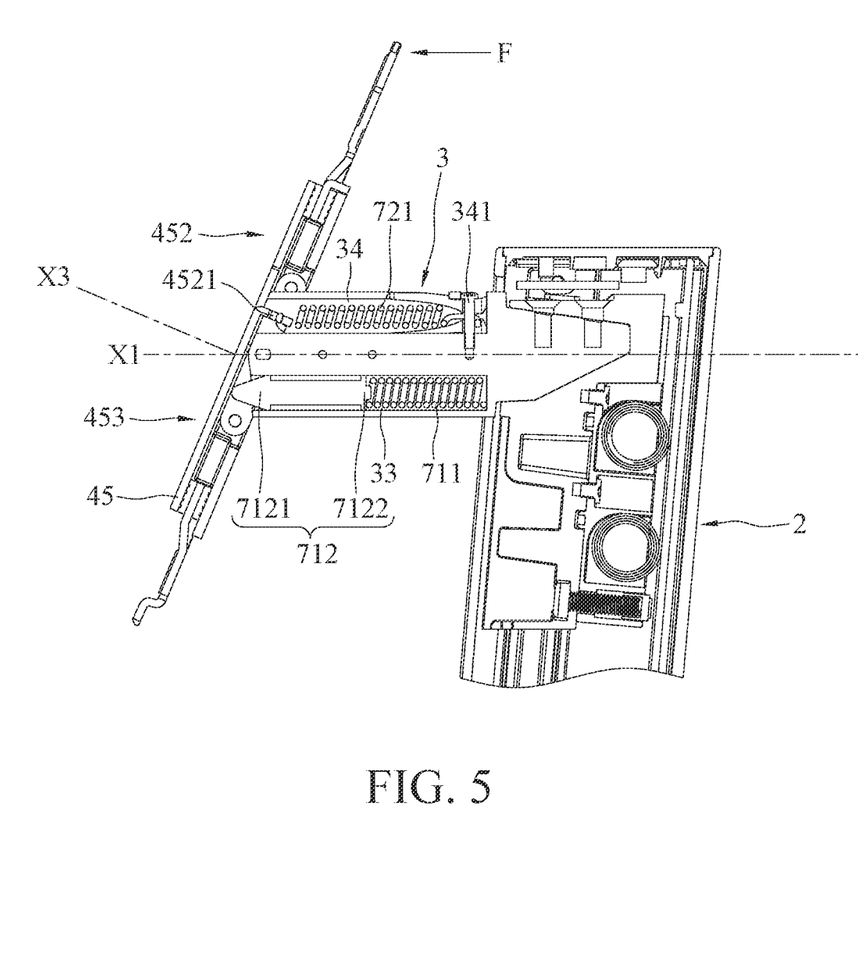
FIG. 5 is a schematic diagram of the supporting device according to the present disclosure in a first position.

Please refer to FIG. 5 at the same time, the protruding neck 3 is arranged on the upright column 2, and partially extends outward from the opening 21 along a first axis X1 that is not parallel to the gravity direction G. In addition, the protruding neck 3 according to the present disclosure is a fixed type as an example, but it can also be a sliding type (for example, a slider that can slide back and forth substantially parallel to the gravity direction G). The protruding neck 3 has a first blind groove 31, a second blind groove 32, a first inner surface 33, a second inner surface 34 and an assembly hole 35. The first blind groove 31 extends substantially parallel to the first axis X1. The second blind groove 32 extends substantially parallel to the first axis X1, and is spaced apart from the first blind groove 31 along the gravity direction G. The first inner surface 33 surrounds and defines the first blind groove 31. The second inner surface 34 surrounds and defines the second blind groove 32 and has a hook portion 341. The assembly hole 35 extends along a second axis X2 substantially perpendicular to the gravity direction G, and the cross section of the assembly hole 35 is non-circular.

The carrying board unit 4 has a first frame 43, a second frame 44, a front plate 45, a main plate 46, a rear plate 47, an accommodating space 48, and two friction rings 49. Please refer to FIG. 4A at the same time, the first frame 43 is provided on one side of the protruding neck 3, and has a first upper half part 431, a first lower half part 432, two first screw holes 433, and four first screw fixing holes 434 relative to the gravity direction G. The first screw holes 433 are respectively formed on the first upper half part 431 and the first lower half part 432, and the first screw fixing holes 434 are evenly distributed around the peripheries of the first upper half part 431 and the first lower half part 432. The second frame 44 is provided on the other side of the protruding neck 3, and has a second upper half part 441, a second lower half part 442, two second screw holes 443, and four second screw fixing holes 444 relative to the direction of gravity G. The second screw holes 443 are respectively formed on the second upper half part 441 and the second lower half part 442, and the second screw fixing holes 444 are evenly distributed around the peripheries of the second upper half part 441 and the second lower half part 442. The front plate 45 has eight locking holes 451, an upper half area 452, and a lower half area 453. Four of the locking holes 451 are respectively intercommunicated with the first screw fixing holes 434, and the other four locking holes 451 are respectively intercommunicated with the second screw fixing holes 444. For example, screws can be used to pass through the four locking holes 451 and be screwed to the first screw fixing holes 434, and screws can be used to pass through the other four locking holes 451 and be screwed to the second screw fixing holes 444, thereby fixing the front plate 45 to the first frame 43 and the second frame 44. The upper half area 452 and the lower half area 453 are defined by the front plate 45 above and below the first axis X1 and the second axis X2 with respect to the gravity direction G, respectively, and the upper half area 452 has a hook hole 4521. The main plate 46 is used for connecting the display 2000, and has a blocking hook 461 on the side facing the protruding neck 3. The rear plate 47 has two first locking holes 471, two second locking holes 472, and two stoppers 473. The first locking holes 471 and the first screw holes 433 are correspondingly intercommunicated, and the second locking holes 472 and the second screw holes 443 are correspondingly intercommunicated. For example, screws can be used to pass through the first locking holes 471 and be screwed in the first screw holes 433, and screws can be used to pass through the second locking holes 472 and be screwed in the second screw holes 443, thereby fixing the rear plate 47 to the first frame 43 and the second frame 44. The stopper 473 is used to stop the blocking hook 461. The accommodating space 48 is surrounded and defined by the front plate 45, the main plate 46 and the rear plate 47, and is provided for the first frame 43 and the second frame 44 to be contained therein and for the protruding neck 3 to pass through, such that the front plate 45 and the rear plate 47 can confine the first frame 43 and the second frame 44 in the accommodating space 48. The two friction rings 49 are respectively sandwiched between the front plate 45 and the main plate 46, and between the main plate 46 and the rear plate 47, to prevent the main plate 46 from being worn when rotating relative to the front plate 45 and the rear plate 47.

Please refer to FIG. 4A at the same time, the spindle rod unit 5 includes a main spindle rod 51, a first rotating rod 52, a first pivot rod 53, a second rotating rod 54, a second pivot rod 55, and a nut 56. The main spindle rod 51 passes through the first frame 43, the assembly hole 35 of the protruding neck 3, and the second frame 44 along the second axis X2. The first frame 43 and the second frame 44 can pivot relative to the main spindle rod 51, the first upper half part 431 and the second upper half part 441 are located above the main spindle rod 51, and the first lower half part 432 and the second lower half part 442 are located below the main spindle rod 51. As mentioned above, the first axis X1 and the second axis X2 are used to define the upper half area 452 and the lower half area 453, which is substantially the same as defining the upper half area 452 and the lower half area 453 by being located above and below the main spindle rod 51. In other words, the first upper half part 431 and the second upper half part 441 are equivalent to a part of the upper half area 452, and the first lower half part 432 and the second lower half part 442 are equivalent to a part of the lower half area 453 in the embodiment. The cross section of the main spindle rod 51 is non-circular, and matches the cross section of the assembly hole 35 to be fixed to the protruding neck 3. The first rotating rod 52, which is parallel to the second axis X2 and passes through the first upper half part 431, can rotate relative to the main spindle rod 51 with the second axis X2 as the axis, and has a circular cross section. The first pivot rod 53, which is parallel to the second axis X2 and passes through the first lower half part 432, can rotate relative to the main spindle rod 51 with the second axis X2 as the axis, and has a circular cross section. The first rotating rod 52, the main spindle rod 51 and the first pivot rod 53 are substantially arranged up and down along the gravity direction G. The second rotating rod 54, which is parallel to the second axis X2 and passes through the second upper half part 441, can rotate relative to the main spindle rod 51 with the second axis X2 as the axis, and has a circular cross section. The second pivot rod 55, which is parallel to the second axis X2 and passes through the second lower half part 442, can rotate relative to the main spindle rod 51 with the second axis X2 as the axis, and has a circular cross section. The second rotating rod 54, the main spindle rod 51 and the second pivot rod 55 are substantially arranged up and down along the gravity direction G. The nut 56 is screwed to the main spindle rod 51, and a plurality of gaskets are arranged between the nut 56 and the second frame 44. With the above configuration, the carrying board unit 4 can be switched between a first position (FIG. 5) and a second position (FIG. 6), that is, switching the tilt angle of view. During the switching, the first rotating rod 52, the first pivot rod 53, the second rotating rod 54 and the second pivot rod 55 actuate in synchronization.

Please refer to FIGS. 4B and 4C at the same time, the friction unit 6 includes a first fin set 61, a first friction set 62, a second fin set 63, a second friction set 64, a first upper gasket set 65, a first lower gasket set 66, a first reinforcing piece 67, a second reinforcing piece 68, a second upper gasket set 69 and a second lower gasket set 60.

The first fin set 61 has seven first fins 611 which are flat and elongated, and each of the first fins 611 has a first circular hole 6111, a first through hole 6112 and a first penetrating hole 6113, wherein the first circular hole 6111 is provided for the main spindle rod 51 to pass through, the first through hole 6112 is provided for the first rotating rod 52 to pass through, and the first penetrating hole 6113 is provided for the first pivot rod 53 to pass through. The cross sections of the first circular holes 6111, the first through holes 6112 and the first penetrating holes 6113 are all circular. In addition, each of the first fins 611 has a first length L1 and a first width W1, wherein the first length L1 is greater than the first width W1. When the first rotating rod 52 and the first pivot rod 53 rotate relative to the main spindle rod 51, the first rotating rod 52 and the first pivot rod 53 can together drive the first fins 611 to rotate with the second axis X2 as the axis.

The first friction set 62 has eight first friction pieces 621 which are ring-shaped, and each of the first friction pieces 621 has a first fixing hole 6211 for the main spindle rod 51 to pass through. The cross section of each of the first fixing holes 6211 matches the cross section of the main spindle rod 51. The first friction pieces 621 and the first fins 611 are stacked alternately. When the first rotating rod 52 and the first pivot rod 53 rotate relative to the main spindle rod 51, the first friction piece 621 is free from rotating relative to the main spindle rod 51, and each of the first fins 611 generates relative rotation and friction with the first friction piece 621 which is adjacent thereto.

The second fin set 63 has seven second fins 631 which are flat and elongated, and each of the second fins 631 has a second circular hole 6311, a second through hole 6312 and a second penetrating hole 6313, wherein the second circular hole 6311 is provided for the main spindle rod 51 to pass through, the second through hole 6312 is provided for the second rotating rod 54 to pass through, and the second penetrating hole 6313 is provided for the second pivot rod 55 to pass through. The cross sections of the second circular holes 6311, the second through holes 6312 and the second penetrating holes 6313 are all circular. In addition, each of the second fins 631 has a second length L2 and a second width W2, wherein the second length L2 is greater than the second width W2. When the second rotating rod 54 and the second pivot rod 55 rotate relative to the main spindle rod 51, the second rotating rod 54 and the second pivot rod 55 can together drive the second fin 631 to rotate with the second axis X2 as the axis.

The second friction set 64 has eight second friction pieces 641 which are ring-shaped, and each of the second friction pieces 641 has a second fixing hole 6411 for the main spindle rod 51 to pass through. The cross section of each of the second fixing hole 6411 matches the cross section of the main spindle rod 51. The second friction pieces 641 and the second fins 631 are stacked alternately. When the second rotating rod 54 and the second pivot rod 55 rotate relative to the main spindle rod 51, the second friction piece 641 is free from rotating relative to the main spindle rod 51, and each of the second fins 631 generates relative rotation and friction with the second friction piece 641 which is adjacent thereto.

The first upper gasket set 65 has eight first upper gaskets 651, which are ring-shaped, for the first rotating rod 52 to be sleeved and to move simultaneously with the first rotating rod 52. The first upper gaskets 651 and the first fins 611 are stacked alternately, that is, two adjacent first fins 611 clamp one of the first upper gaskets 651, and one of the first upper gaskets 651 is arranged between the first frame 43 and the first fin 611 closest to the first frame 43. The first lower gasket set 66 has eight first lower gaskets 661 for the first pivot rod 53 to be sleeved, and to move simultaneously with the first pivot rod 53. The first lower gaskets 661 and the first fins 611 are stacked alternately, that is, two adjacent first fins 611 clamp one of the first lower gaskets 661, and one of the first lower gaskets 661 is arranged between the first frame 43 and the first fin 611 closest to the first frame 43. The first upper gaskets 651 and the first lower gaskets 661 are spaced apart along the gravity direction G.

The second upper gasket set 69 has eight second upper gaskets 691, which are ring-shaped, for the second rotating rod 54 to be sleeved and to move simultaneously with the second rotating rod 54. The second upper gaskets 691 and the second fins 631 are stacked alternately, that is, two adjacent second fins 631 clamp one of the second upper gaskets 691, and one of the second upper gaskets 691 is arranged between the second frame 44 and the second fin 631 closest to the second frame 44. The second lower gasket set 60 has eight second lower gaskets 601 for the second pivot rod 55 to be sleeved, and to move simultaneously with the second pivot rod 55. The second lower gaskets 601 and the second fins 631 are stacked alternately, that is, two adjacent second fins 631 clamp one of the second lower gaskets 601, and one of the second lower gaskets 601 is arranged between the second frame 44 and the second fin 631 closest to the second frame 44. The second upper gaskets 691 and the second lower gaskets 601 are spaced apart along the gravity direction G.

The first reinforcing piece 67 is in the shape of a long plate, is arranged between the first fin set 61 and the protruding neck 3, and has a first hole 671, a first rotating screw hole 672 and a first pivot screw hole 673, wherein the first hole 671 is provided for the main spindle rod 51 to pass through, the first rotating screw hole 672 is provided for the first rotating rod 52 to screw, and the first pivot screw hole 673 is provided for the first pivot rod 53 to screw. The cross sections of the first hole 671, the first rotating screw hole 672 and the first pivot screw hole 673 are circular and can be rotated relative to the main spindle rod 51. In addition, one of the first upper gaskets 651, one of the first friction pieces 621 and one of the first lower gaskets 661 are further arranged between the first reinforcing piece 67 and the first fin set 61, and the thickness of the first reinforcing piece 67 is greater than the thickness of each of the first fins 611. The second reinforcing piece 68 is arranged between the second fin set 63 and the protruding neck 3, and its technical content is the same as that of the first reinforcing piece 67, which will not be repeated here.

The number of the aforementioned first fins 611, first friction pieces 621, second fins 631, second friction pieces 641, first upper gaskets 651, first lower gaskets 661, second upper gaskets 691 and second lower gaskets 601 can be increased or decreased according to the design, and the present disclosure is not limited to this. In addition, in order to facilitate assembly, a plurality of first fins 611 can be integrally formed on a connecting plate to form a fin-like structure, and a plurality of first friction pieces 621 can also be integrally formed on a connecting plate to form a fin-like structure, so that the assembly can be completed as long as the two fin-like structures are inserted into each other.

On the other hand, after the first rotating rod 52 and the first pivot rod 53 are screwed on the first reinforcing piece 67, the first fin set 61 and the first friction set 62 are limited between the first frame 43 and the first reinforcing piece 67, such that the first frame 43, the first rotating rod 52, the first pivot rod 53, the first fin set 61, the first friction set 62, the first upper gasket set 65, the first lower gasket set 66 and the first reinforcing piece 67 can be arranged on one side of the protruding neck 3 together, and are completely accommodated in the accommodating space 48. Similarly, the second frame 44, the second rotating rod 54, the second pivot rod 55, the second fin set 63, the second friction set 64, the second upper gasket set 69, the second lower gasket set 60 and the second reinforcing piece 68 can be arranged on the other side of the protruding neck 3 together, and are completely accommodated in the accommodating space 48. The first frame 43, the first rotating rod 52, the first pivot rod 53, the first fin set 61, the first friction set 62, the first upper gasket set 65, the first lower gasket set 66, the first reinforcing piece 67, the second frame 44, the second rotating rod 54, the second pivot rod 55, the second fin set 63, the second friction set 64, the second upper gasket set 69, the second lower gasket set 60 and the second reinforcing piece 68 can also be limited in the accommodating space 48 by the front plate 45 and the rear plate 47.

The elastic element set 7 includes a first elastic element 71 and a second elastic element 72. The first elastic element 71 is accommodated in the first blind groove 31 and has a compression spring 711, a cone column 712 and a sleeve 713, and can constantly provide a first elastic force. One end of the compression spring 711 abuts against the first inner surface 33. The cone column 712 has a tip 7121 and a flat end 7122 opposite to the tip 7121, and the tip 7121 abuts against the lower half area 453 of the front plate 45. The flat end 7122 abuts against the other end of the compression spring 711. The sleeve 713 is sleeved on the cone column 712 to reduce abrasion and increase smoothness when the cone column 712 slides relative to the first blind groove 31. The second elastic element 72 is accommodated in the second blind groove 32 and has an extension spring 721 and can constantly provide a second elastic force. One end of the extension spring 721 is disposed on the upper half area 452 of the front plate 45, for example, hooked in the hook hole 4521, and the other end is disposed on the hook portion 341. The hook portion 341 is a screw penetrating through the second blind groove 32. In other embodiments, the hook portion 341 can also be a hook column or rod. As described above, the actual elastic force of the elastic element set 7 is the sum of the first elastic force and the second elastic force.

Figure 6:
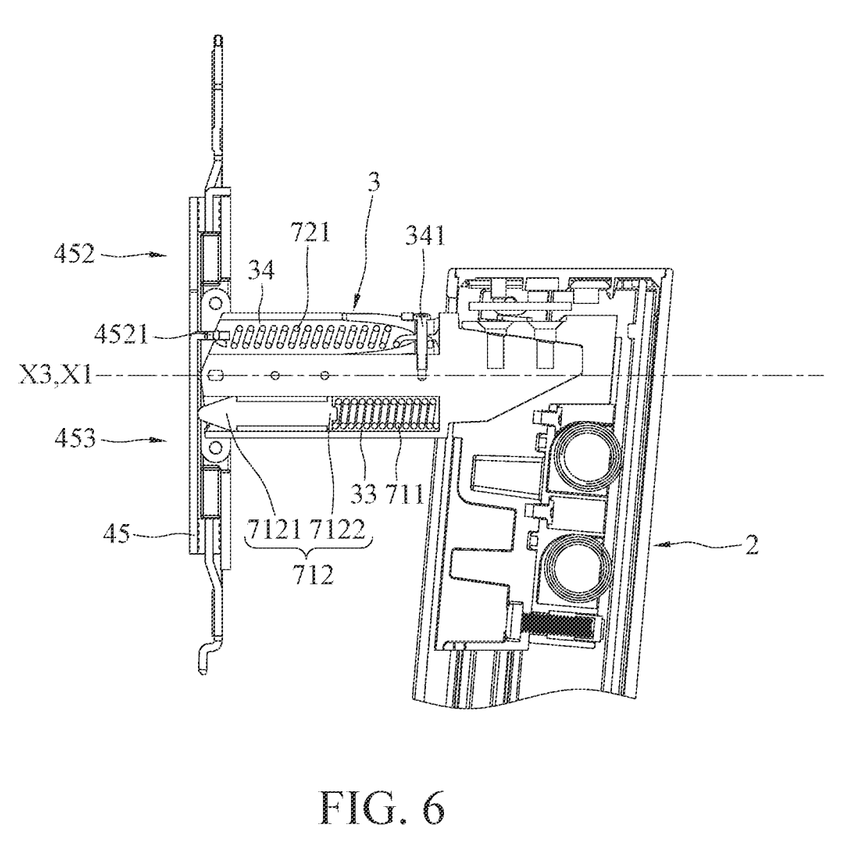
FIG. 6 is a schematic diagram of the supporting device according to the present disclosure in a second position.

Please refer to FIGS. 5 and 6, when an external force F is applied to transfer the carrying board unit 4 from the first position to the second position, the upper half area 452 drives the extension spring 721, so that the extension amount of the extension spring 721 gradually increases. The tip 7121 of the cone column 712 is pressed by the lower half area 453, and the flat end 7122 abuts against the compression spring 711, so that the compression amount of the compression spring 711 gradually increases, thereby adjusting an inclination angle of the display 2000 while driving the first fin set 61 and the second fin set 63 to rotate with the second axis X2 as an axis, but the first friction set 62 and the second friction set 64 are free from rotating relative to the main spindle rod 51, so that each of the first fins 611 generates relative rotation and friction with the adjacent first friction pieces 621, and each of the second fins 631 generates relative rotation and friction with the adjacent second friction pieces 641. When the external force F is removed, the carrying board unit 4 can stop at any position between the first position and the second position.

The first elastic element 71 and the second elastic element 72 are described by using a combination of the compression spring 711 and the extension spring 721, respectively, but the present disclosure is not limited to this. In other embodiments, only a single compression spring may be provided, or only a single extension spring may be provided, or other types of springs (such as torsion springs) may also be provided. In addition, the number of springs can also be increased or decreased according to the design, and the present disclosure is not limited to this. However, because the more compressed the compression spring is, the greater the elasticity, so it can only be set on the lower half area 453 of the front plate 45, while the more extended the extension spring is, the greater the elasticity, so it can only be set on the upper half area 452 of the front plate 45, so that the elastic force provided in the first position is less than the elastic force provided in the second position.

In addition to adjusting the inclination angle of the display 2000, the present disclosure can also change the display 2000 in a vertical state or a horizontal state. For instance, the main plate 46 can rotate relative to the protruding neck 3 about a third axis X3, and an angle between the two stoppers 473 of the rear plate 47 is approximately 180 degrees. When the blocking hook 461 is free from being stopped by the stopper 473 and is located at the center line between the two stoppers 473, the display 2000 is in the horizontal state relative to the upright column 2. When the main plate 46 rotates and the blocking hook 461 is stopped by one of the stoppers 473, the display 2000 is in the vertical state relative to the upright column 2. When the carrying board unit 4 is in the second position, the first axis X1 coincides with the third axis X3. In addition, the above-mentioned implementation of the second position according to the present disclosure is described with the carrying board unit 4 being perpendicular to the protruding neck 3, but it is not limited to this. The second position referred to in the present disclosure may also be an embodiment in which the carrying board unit 4 is rotated to the upper half area 452 farther away from the upright column 2 than the lower half area 453.

In summary, the elastic element set in the supporting device according to the present disclosure is free from being required to be sleeved on the spindle rod, but the elastic element set is accommodated in the protruding neck, so that the overall thickness of the carrying board unit can be thinned, and the type of spring used in the elastic element set can also be changed according to requirements. In addition, in the supporting device according to the present disclosure, the fins and friction pieces are stacked in an alternate configuration and are sleeved on the spindle rod at the same time, which can ensure the effective friction between the fins and the friction pieces, and the friction between the fins and the friction pieces can be adjusted by the tightness or the number of the fins and the friction pieces. The supporting device according to the present disclosure has technical effects such as being able to meet the elasticity requirements when mounting large-size displays, effectively reducing the overall thickness of the carrying board unit and achieving thinness.

What is claimed is:

1. A supporting device, comprising:
   an upright column substantially extending along a gravity direction and including an opening;
   a protruding neck arranged on the upright column and partially extending outward from the opening along a first axis being not parallel to the gravity direction;
   a spindle rod unit having:
      a main spindle rod fixed on the protruding neck along a second axis; and
      a first rotating rod;
   a carrying board unit for carrying a display and having a first frame, the first frame being pivoted on the main spindle rod and having a first upper half part and a first lower half part relative to the gravity direction and the second axis, the first upper half part being located above the main spindle rod, the first lower half part being located below the main spindle rod, the first rotating rod passing through one of the first upper half part and the first lower half part in parallel to the second axis and being able to rotate relative to the main spindle rod with the second axis as an axis, and the carrying board unit being able to rotate between a first position and a second position relative to the protruding neck with the second axis as the axis;
   a friction unit having:
      a first fin set having a plurality of first fins, and each of the first fins being sleeved on the main spindle rod and the first rotating rod, respectively; and
      a first friction set having a plurality of first friction pieces, and each of the first fins and each of the first friction pieces being stacked alternately, the first fin set being able to rotate with the second axis as the axis driven by the first rotating rod thereby making each of the first fins generates relative rotation and friction with the adjacent first friction piece; and
   an elastic element set connecting the protruding neck and the carrying board unit and constantly providing an elastic force.

2. The supporting device of claim 1, wherein each of the first fins has a first circular hole and a first through hole, the main spindle rod passes through the first circular holes, and the first rotating rod passes through the first through holes, and wherein a cross section of each of the first circular holes and a cross section of each of the first through holes are both circular, a cross section of the main spindle rod is non-circular, and a cross section of the first rotating rod is circular.

3. The supporting device of claim 2, wherein each of the first fins has a first length and a first width, and each of the first lengths is greater than each of the first widths.

4. The supporting device of claim 3, wherein the spindle rod unit further has a first pivot rod, the first pivot rod passes through the other one of the first upper half part and the first lower half part in parallel to the second axis, passes through the first fin set, is able to rotate relative to the main spindle rod with the second axis as the axis, and drives the first fin set to rotate together with the first rotating rod.

5. The supporting device of claim 4, wherein the protruding neck includes an assembly hole, each of the first friction pieces has a first fixing hole, the main spindle rod passes through the assembly hole and the first fixing holes, and a cross section of each of the first fixing holes matches the cross section of the main spindle rod, and wherein when the carrying board unit pivots relative to the protruding neck, the first friction pieces are free from rotating relative to the main spindle rod.

6. The supporting device of claim 5, wherein the first rotating rod, the main spindle rod and the first pivot rod are arranged up and down along the gravity direction.

7. The supporting device of claim 6, wherein the friction unit further has a first upper gasket set and a first lower gasket set, wherein the first upper gasket set is sleeved on the first rotating rod and moves simultaneously with the first rotating rod, and the first lower gasket set is sleeved on the first pivot rod and moves simultaneously with the first pivot rod, and wherein the first upper gasket set and the first lower gasket set are spaced apart along the gravity direction.

8. The supporting device of claim 7, wherein each of the first fins further has a first penetrating hole, the first pivot rod passes through the first penetrating holes, wherein the first upper gasket set has a plurality of first upper gaskets, and the first lower gasket set has a plurality of first lower gaskets, and wherein one of the first upper gaskets is sandwiched between two adjacent ones of the first fins, and one of the first lower gaskets is sandwiched between two adjacent ones of the first fins.

9. The supporting device of claim 8, wherein the friction unit further has a first reinforcing piece, the first reinforcing piece is arranged between the first fin set and the protruding neck and has a first hole, a first rotating screw hole and a first pivot screw hole, and wherein the first hole is provided for the main spindle rod to pass through, the first rotating screw hole is provided for the first rotating rod to screw, and the first pivot screw hole is provided for the first pivot rod to screw to rotate relative to the main spindle rod.

10. The supporting device of claim 9, wherein a thickness of the first reinforcing piece is greater than a thickness of any of the first fins.

11. The supporting device of claim 1, wherein:
the carrying board unit further has a second frame pivoted on the main spindle rod, and has a second upper half part and a second lower half part relative to the gravity direction, the second upper half part is located above the main spindle rod, and the second lower half part is located below the main spindle rod;
the spindle rod unit further has:
a second rotating rod passing through one of the second upper half part and the second lower half part parallel to the second axis, and being able to rotate relative to the main spindle rod with the second axis as the axis;
the friction unit further has:
a second fin set having a plurality of second fins, and each of the second fins being respectively sleeved on the main spindle rod and the second rotating rod; and
a second friction set having a plurality of second friction pieces, and each of the second fins and each of the second friction pieces being stacked alternately, the second fin set being able to rotate with the second axis as the axis driven by the second rotating rod such that each of the second fins generates relative rotation and friction with the adjacent second friction piece.

12. The supporting device of claim 11, wherein the carrying board unit further includes a front plate, a main plate, a rear plate and an accommodating space, wherein the main plate is located between the front plate and the rear plate, and the front plate, the main plate and the rear plate together surround and define the accommodating space, wherein the first frame, the first rotating rod, the first fin set and the first friction set are arranged on one side of the protruding neck and accommodated in the accommodating space, and wherein the second frame, the second rotating rod, the second fin set and the second friction set are arranged on the other side of the protruding neck and accommodated in the accommodating space.

13. The supporting device of claim 12, wherein the rear plate has a first locking hole and a second locking hole, the first frame has a first screw hole, the second frame has a second screw hole, the first locking hole and the first screw hole are correspondingly intercommunicated, the second locking hole and the second screw hole are correspondingly intercommunicated, and the accommodating space is provided for the protruding neck to pass through, and wherein the first frame and the second frame are able to be limited in the accommodating space by the front plate and the rear plate.

14. The supporting device of claim 13, wherein the carrying board unit further has two friction rings, one of the friction rings is sandwiched between the main plate and the front plate, and the other one of the friction rings is sandwiched between the main plate and the rear plate.

15. The supporting device of claim 14, wherein each of the second fins has a second circular hole and a second through hole, the main spindle rod passes through the second circular holes, and the second rotating rod passes through the second through holes, wherein a cross section of each of the second circular holes and a cross section of each of the second through holes are both circular, and a cross section of the second rotating rod is circular.

16. The supporting device of claim 15, wherein each of the second fins has a second length and a second width, and each of the second lengths is greater than each of the second widths.

17. The supporting device of claim 16, wherein the elastic element set includes a first elastic element and a second elastic element, and the protruding neck has a first blind groove and a second blind groove, and wherein the first elastic element is accommodated in the first blind groove, and the second elastic element is accommodated in the second blind groove.

18. The supporting device of claim 17, wherein the first elastic element has a compression spring, and the second elastic element has an extension spring, and wherein when the carrying board unit is transferred from the first position to the second position, a compression amount of the compression spring gradually increases, and an extension amount of the extension spring gradually increases.

19. The supporting device of claim 18, wherein the front plate has a hook hole, the protruding neck includes a hook portion, and the extension spring is respectively disposed on the hook hole and the hook portion.

20. The supporting device of claim 19, wherein the main plate is connected to the display and has a blocking hook, the rear plate further has two stoppers, and wherein the main plate is able to rotate relative to the protruding neck about a third axis, and when the blocking hook is stopped by one of the stoppers, the display is in a vertical state relative to the upright column.

* * * * *